United States Patent
Degenaro et al.

(10) Patent No.: US 6,954,924 B2
(45) Date of Patent: Oct. 11, 2005

(54) SYSTEM AND METHOD FOR EMPLOYING EXTERNALIZED, DYNAMICALLY CONFIGURABLE, CACHEABLE TRIGGER POINTS

(75) Inventors: Louis R. Degenaro, White Plains, NY (US); Shawn William Lauzon, Rochester, MN (US); Jon Kendall Peterson, Rochester, MN (US); Dianne E. Richards, Mantorville, MN (US); Isabelle Marie Rouvellou, New York, NY (US); Scott E. Waldner, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 545 days.

(21) Appl. No.: 09/956,644

(22) Filed: Sep. 20, 2001

(65) Prior Publication Data

US 2003/0056201 A1 Mar. 20, 2003

(51) Int. Cl.[7] .............................................. G06F 9/44
(52) U.S. Cl. ...................... 717/131; 717/127; 717/128; 717/130
(58) Field of Search .............................. 717/127, 128, 717/130, 131, 141, 154; 711/113, 118; 712/227

(56) References Cited

U.S. PATENT DOCUMENTS

| | | | | |
|---|---|---|---|---|
| 5,758,061 A | * | 5/1998 | Plum | 714/35 |
| 5,907,710 A | * | 5/1999 | Furukawa et al. | 717/143 |
| 6,016,477 A | | 1/2000 | Ehnebuske et al. | |
| 6,148,302 A | * | 11/2000 | Beylin et al. | 707/102 |
| 6,253,217 B1 | * | 6/2001 | Dourish et al. | 715/500 |
| 6,397,382 B1 | * | 5/2002 | Dawson | 717/130 |
| 6,487,713 B1 | * | 11/2002 | Cohen et al. | 717/105 |
| 6,526,567 B1 | * | 2/2003 | Cobbett et al. | 717/124 |
| 6,629,123 B1 | * | 9/2003 | Hunt | 718/106 |
| 6,732,084 B1 | * | 5/2004 | Kabra et al. | 707/2 |
| 6,745,174 B2 | * | 6/2004 | Levy et al. | 707/2 |
| 6,763,452 B1 | * | 7/2004 | Hohensee et al. | 712/227 |
| 6,801,940 B1 | * | 10/2004 | Moran et al. | 709/224 |
| 6,826,748 B1 | * | 11/2004 | Hohensee et al. | 717/130 |

OTHER PUBLICATIONS

TITLE: Event Specification in an Active Object–Oriented Database, author: Gehani et al, 1992, ACM.*

TITLE: Integrating Performance monitoring and communication in Parallel Computers, author: Martonosi et al, ACM, 1996.*

U.S. Appl. No. 09/712,542, entitled "Method and System for Caching Across Multiple Contexts" Degenaro et al. . filed on Nov. 14, 2000.

U.S. Appl. No. 09/542,269, entitled "System and Method for Caching Sets of Objects" Degenaro et al. . filed on Apr. 4, 2000.

(Continued)

*Primary Examiner*—Chameli C. Das
(74) *Attorney, Agent, or Firm*—F. Chau & Associates, LLC (57) ABSTRACT

There is provided a method for employing a trigger point in a logic flow. The trigger point has at least one function associated therewith. A default strategy set is associated with the at least one function of the trigger point. The default strategy set has a capability of being replaced, in whole or in part, by a non-default strategy set. The strategy sets are for implementing the at least one function of the trigger point. The trigger point is dynamically configured, including establishing at least one context for the trigger point that respectively specifies a location of the strategy sets. The trigger point is executed when encountered during an execution of the logic flow, including selectively executing at least a portion of at least one of the default strategy set and the non-default strategy set based upon a current context from among the at least one context.

34 Claims, 8 Drawing Sheets

OTHER PUBLICATIONS

U.S. Appl. No. 09/298,046, entitled "System and Method for Managing Cachable Entities" Degenaro et al. . filed on Apr. 22, 1999.

U.S. Appl. No. 09/204,973, entitled "Method and Apparatus for Applying Business Rules In An Object Model Driven Context" filed on Dec. 3, 1998.

U.S. Appl. No. 09/648,681, entitled "Reclaim Space Reserve for A Compressed Memory System" filed on Aug. 25, 2000.

U.S. Appl. No. 09/204,970, entitled "Method and Data Processing System for Specifying and Applying Rules to Classification–Based Decision Points in an Application System" filed on Dec. 3, 1998.

* cited by examiner

SYSTEM AND METHOD FOR EMPLOYING EXTERNALIZED, DYNAMICALLY CONFIGURABLE, CACHEABLE TRIGGER POINTS

BACKGROUND OF THE INVENTION

1. Technical Field

The present invention relates generally to data processing and, in particular, to a system and method for employing externalized, dynamically configurable, cacheable trigger points, including specifying, applying, and managing the same.

2. Description of Related Art

The use of a trigger point (also referred to as a control point or a decision point) is a technique commonly employed to optimize reusability. Typically, a trigger point is a location in a flow of logic where a standardized piece of logic is installed to perform some reusable function. Often the trigger point logic appeals to some other entity to perform the reusable function. One simple example is that of a subroutine call in a main program, where the subroutine call, including the marshaling of parameters that are passed to the subroutine and the results that are returned from the subroutine, can be considered as a trigger point. Another example is that of an interactive debugger, where a debug trigger point can be placed in the application logic so as to cede control to the debugger.

In the context of externalized business rules, a trigger point object may perform the following functions: marshal parameters; find the set of rules that apply; filter (order, narrow, and so forth) the set of rules that apply; apply or fire the filtered set of rules (which may include rearrangement of parameters); and coalesce the results of firing the rules. In this case, the logic of the trigger point is much more complex than that of a subroutine or debugger call. Each step in the process is itself algorithmic in nature. For example, how to marshal parameters may vary from one trigger point to another trigger point. Similarly, how to establish the set of rules that apply may vary between different trigger points. Further, over time, the behavior of a trigger point (e.g., which algorithms the trigger point employs to carry out its chores) may need to be altered in a manageable way. Other contexts where trigger points invoke complex algorithms of constituent parts may exist now or at some future time.

Accordingly, it would be desirable and highly advantageous to have a system and method for externalized, dynamically configured, cacheable trigger points. Such a system and method should address the key problem of how to precisely govern trigger point behavior while simultaneously delivering optimal performance and maximal flexibility in behavior adaptation.

SUMMARY OF THE INVENTION

The problems stated above, as well as other related problems of the prior art, are solved by the present invention, a system and method for employing externalized, dynamically configurable, cacheable trigger points, including specifying, applying, and managing the same.

The present invention allows for the supervision of trigger point (and thus application) behavior. Advantageously, the present invention provides the ability to dynamically configure trigger point behavior. Moreover, the present invention allows for the externalization of the data that controls the dynamically configurable trigger point behavior. Additionally, the present invention allows for the caching of information generated and utilized by externally configurable behaviors. These and other features of the present invention provide useful capabilities for controlling and managing applications, as described in further detail below.

According to an aspect of the present invention, there is provided a method for employing a trigger point in a logic flow. The trigger point has at least one function associated therewith. The method includes the step of associating a default strategy set with the at least one function of the trigger point. The default strategy set has a capability of being replaced, in whole or in part, by a non-default strategy set. The strategy sets are for implementing the at least one function of the trigger point. The trigger point is dynamically configured, including the step of establishing at least one context for the trigger point. The at least one context respectively specifies a location of the default strategy set and the non-default strategy set. The trigger point is executed when the trigger point is encountered during an execution of the logic flow, including selectively executing at least a portion of at least one of the default strategy set and the non-default strategy set based upon a current context from among the at least one context.

According to another aspect of the present invention, there is provided a system for employing a trigger point in a logic flow. The trigger point has at least one function associated therewith. The system includes means for associating a default strategy set with the at least one function of the trigger point. The default strategy set has a capability of being replaced, in whole or in part, by a non-default strategy set. The strategy sets is for implementing the at least one function of the trigger point. The system also includes means for dynamically configuring the trigger point, including means for establishing at least one context for the trigger point. The at least one context respectively specifies a location of the default strategy set and the non-default strategy set. The system further includes means for executing the trigger point when the trigger point is encountered during an execution of the logic flow, including means for selectively executing at least a portion of at least one of the default strategy set and the non-default strategy set based upon a current context from among the at least one context.

According to yet another aspect of the present invention, there is provided a method for employing a trigger point in a logic flow. The trigger point has at least one function associated therewith. The method includes the step of associating a default strategy set with the at least one function of the trigger point. The default strategy set has a capability of being replaced, in whole or in part, by a non-default strategy set. The strategy sets are for implementing the at least one function of the trigger point. The trigger point is dynamically configured, including the step of establishing at least one context for the trigger point. The at least one context respectively specifies a location of the default strategy set and the non-default strategy set. The trigger point is executed each time the trigger point is encountered during the execution of the logic flow, such executions including determining a current context from among the at least one context to identify which portions, if any, of the default strategy set and the non-default strategy set are to be executed, and executing the identified portions.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

It is to be understood that the present invention may be implemented in various forms of hardware, software, firmware, special purpose processors, or a combination thereof. Preferably, the present invention is implemented in software, the software being an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) which is executed via the operating system. In addition, various other peripheral devices may be connected to the computer platform such as an additional data storage device.

It is to be further understood that, because some of the constituent system components depicted in the accompanying Figures may be implemented in software, the actual connections between the system components may differ depending upon the manner in which the present invention is programmed. Given the teachings herein, one of ordinary skill in the related art will be able to contemplate these and similar implementations or configurations of the present invention.

Figure 1A:
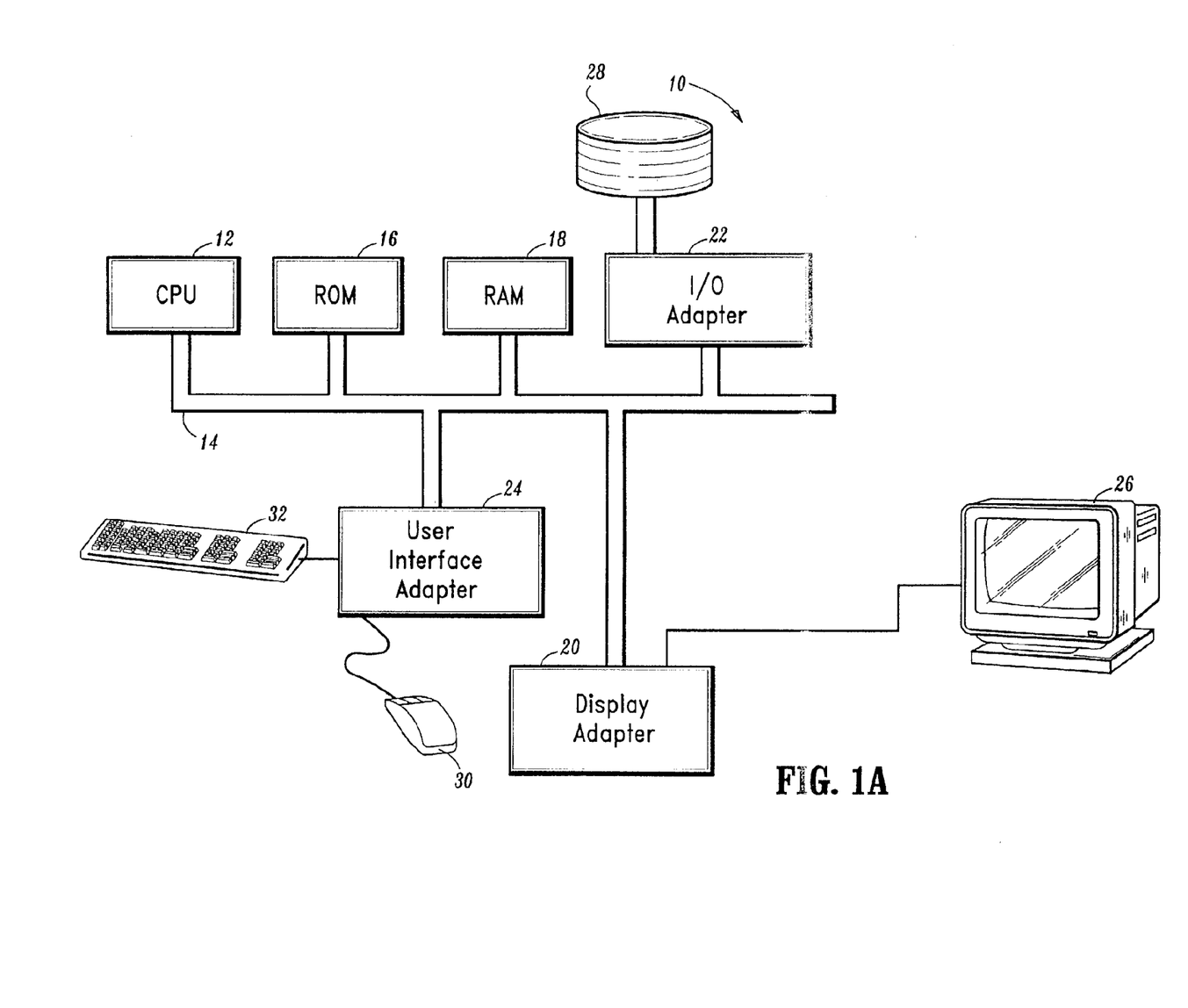
FIG. 1A is a block diagram of a computer processing system 10 to which the present invention may be applied, according to an illustrative embodiment thereof.

FIG. 1A is a block diagram of a computer processing system 10 to which the present invention may be applied, according to an illustrative embodiment thereof. The computer processing system 10 includes at least one processor (CPU) 12 operatively coupled to other components via a system bus 14. A read only memory (ROM) 16, a random access memory (RAM) 18, a display adapter 20, an I/O adapter 22, and a user interface adapter 24 are operatively coupled to the system bus 14.

A display device 26 is operatively coupled to the system bus 14 by the display adapter 20. A disk storage device (e.g., a magnetic or optical disk storage device) 28 is operatively coupled to the system bus 14 by the I/O adapter 22.

A mouse 30 and keyboard 32 are operatively coupled to the system bus 14 by the user interface adapter 24. The mouse 30 and keyboard 32 may be used to input/output information to/from the computer processing system 10.

While the computer processing system 10 has been described herein with reference to the above elements, it is to be appreciated that additions, deletions, and substitutions of elements may be made with respect thereto. That is, given the teachings of the present invention provided herein, one of ordinary skill in the related art will contemplate this and various other configurations of the elements of computer processing system 10, while maintaining the spirit and scope of the present invention.

The present invention provides a method and system for specifying, applying, and managing trigger points (also referred to as control points or decision points) in a data processing application. Among other things, the present invention addresses the key problem of how to understand and precisely govern the conduct of a trigger point while simultaneously providing for optimal performance and maximal flexibility in behavior adaptation.

The present invention allows for the supervision of trigger point (and thus application) behavior. Advantageously, the present invention provides the ability to dynamically configure trigger point behavior. Moreover, the present invention allows for the externalization of the data that controls the dynamically configurable trigger point behavior. Additionally, the present invention allows for the caching of information generated and utilized by externally configurable behaviors.

Using the present invention, a set of strategies may be associated with each logical function (or step) in the trigger point agenda. It is to be appreciated that, as used herein, a set of strategies refers to at least the information needed by a trigger point to dynamically configure itself. A strategy set may include, directly or indirectly, executable and non-executable data, including but not limited to the following: strategies to employ (e.g., finding, filtering, firing, combining, auditing); policies to apply (e.g., application authorized to use?, to change?, record invocation?, record changes?); identifications to consider (e.g., invoker registered?); input/output parameter type combinations that are acceptable (e.g., input=String; output=Integer); locale information (e.g., time zone, language, and so forth); rule set identities to employ (e.g., use rule set X); rule set context assembly and selection algorithms (e.g., calculate a rule set to employ by concatenating parameters 2 and 3); descriptive information (e.g., "this trigger point is used to determine benefit eligibility", and so forth); dates (e.g., effective starting, effective ending, last used); user defined data; user defined configurable algorithms (e.g., code invoked when if trigger point fails); other information and logic that may be beneficially associated with and/or utilized by a trigger point; and so on. It is to be further appreciated that the preceding list is merely illustrative of some of the many types of information corresponding to a trigger point and, thus, other information corresponding to a trigger point may also be employed in accordance with the present invention. That is, given the teachings of the present invention provided herein, one of ordinary skill in the related art will contemplate these and various other information corresponding to a trigger point which may be included in a strategy set(s) used in accordance with the present invention, while maintaining the spirit and scope of the present invention.

As an example, there may be a set of strategies for "firing rules" steps, and another set of strategies for "combining results" steps. A default collection of strategy sets is provided. The collection includes sets of strategies for each logical function contained within the trigger point sequence. Strategies other than the default strategies may also be provided. One particular strategy group, which is a combination of one or more default and other strategies, usually one for each logical step, is associated with each trigger point instance. When no strategy is specified for a logical unit, a default strategy can be utilized.

An example of a strategy group for a particular externalized, configured trigger point might be:
{contexts: insuranceEligibility; marshaling: use first and third parameters in that order; finding: only find classifier rules; filtering: discard rules with "low" priorities, and order those remaining from highest to lowest priority; firing: fire all (non-discarded) rules; combining: return "true" only if all fired rules return "true", else return "false"}.

Another Example of a Strategy Group Might be:
{contexts: type7, type9, type9A; marshaling: use all parameters in order; finding: only find non-classifier rules; filtering: expect exactly one rule to be found; firing: fire the one rule found; combining: return the result of the one rule fired}.

Each strategy group is identifiable in one or more ways by virtue of one or more associated contexts (trigger point identifiers). By having such identification, all trigger points within an application can be reduced to using a single logical algorithm, where each trigger point location is tagged with an appropriate trigger point context. At run-time, if not already built and cached, the externalized trigger point configuration information is referenced by context, the trigger point is dynamically constructed and cached for future reference, and the trigger point is executed when encountered. The cache of constructed trigger points is flushed of stale instances when externalized changes are recorded.

The group of strategies associated with a trigger point instance may be altered at any time, either prior to (i.e., pre-configured) or subsequent to deployment. This can be accomplished by a trigger point management mechanism or tool. A change which causes the modified trigger point behavior is external to the trigger point itself, thus providing a means to alter the various strategies employed in number and selection without modification to the trigger point itself or any of its immediate surroundings.

As an example of a dynamic strategy change, consider that a default filtering strategy might be to employ all the rules (if any) found in a previous step. Other filtering strategies might include: employ the rule or rules having the lowest precedence, if any; employ the rule or rules having the highest precedence, if any; employ the rules in order from highest to lowest priority, if any; and so on. The desired strategy may be changed dynamically; old strategies may be removed and new strategies may be added to the strategies group. Thus, upon the first pass through a trigger point a default strategy might be employed, while on a subsequent pass through the same trigger point an alternate, non-default strategy might be used. In the example given above, the first pass might use the "employ all rules found" filtering strategy while a subsequent pass might use the "employ the rule or rules having the highest precedence only" filtering strategy. This strategy change can be made effective by alterations external to the trigger point itself by manipulation of contexts and/or strategy groups persistently stored elsewhere.

The present invention substantially enhances the flexibility of trigger points without sacrificing precision or performance. By externalizing trigger points and implementing the trigger points as groups of components, manageability and understanding of trigger points is promoted. Providing dynamic configurability encourages extendibility. These various desirable traits may be exploited through interaction with tools, both existing and imagined, for example.

Thus, it is to be appreciated that the externalized data utilized by a trigger point, including, e.g., context information and an associated strategy set(s), may be stored in any type of storage device, including combinations of storage devices. For example, the externalized data may be stored in electronic memories (e.g., cache, RAM, etc.), magnetic memories (e.g., hard drive, floppy disk), optical memories (e.g., CD-ROM, DVD), and so forth. In any event, the final repository for the externalized data must be a persistent storage device so that the externalized data can be freely accessed, deleted, and/or modified whenever necessary or desirable. Accordingly, given the teachings of the present invention provided herein, one of ordinary skill in the related art will contemplate these and various other storage devices in which the externalized data utilized by a trigger point may be stored, while maintaining the spirit and scope of the present invention.

It is to be further appreciated that multiple contexts may be associated with a strategy set. When authorized, contexts may be added/deleted/changed within strategy sets, and strategy set components (as defined above) may be added/deleted/changed.

The implementation of trigger points as groups of components creates the opportunity to construct the trigger points in a standardized manner, thereby encouraging reuse, recycling, and reduction of software logic artifacts. Externalization uncovers previously hidden logic embedded within applications.

One possible use of the present invention is to incorporate registration of individual applications or classes and methods with utilized trigger points across an enterprise. In this way, a person or program could quite easily determine which applications are using which trigger points. The possession of such knowledge would allow one to make more informed decisions as to what eventualities may result from trigger point changes (ultimately affecting the logic applied and thereby determining application program behavior).

Figure 1B:
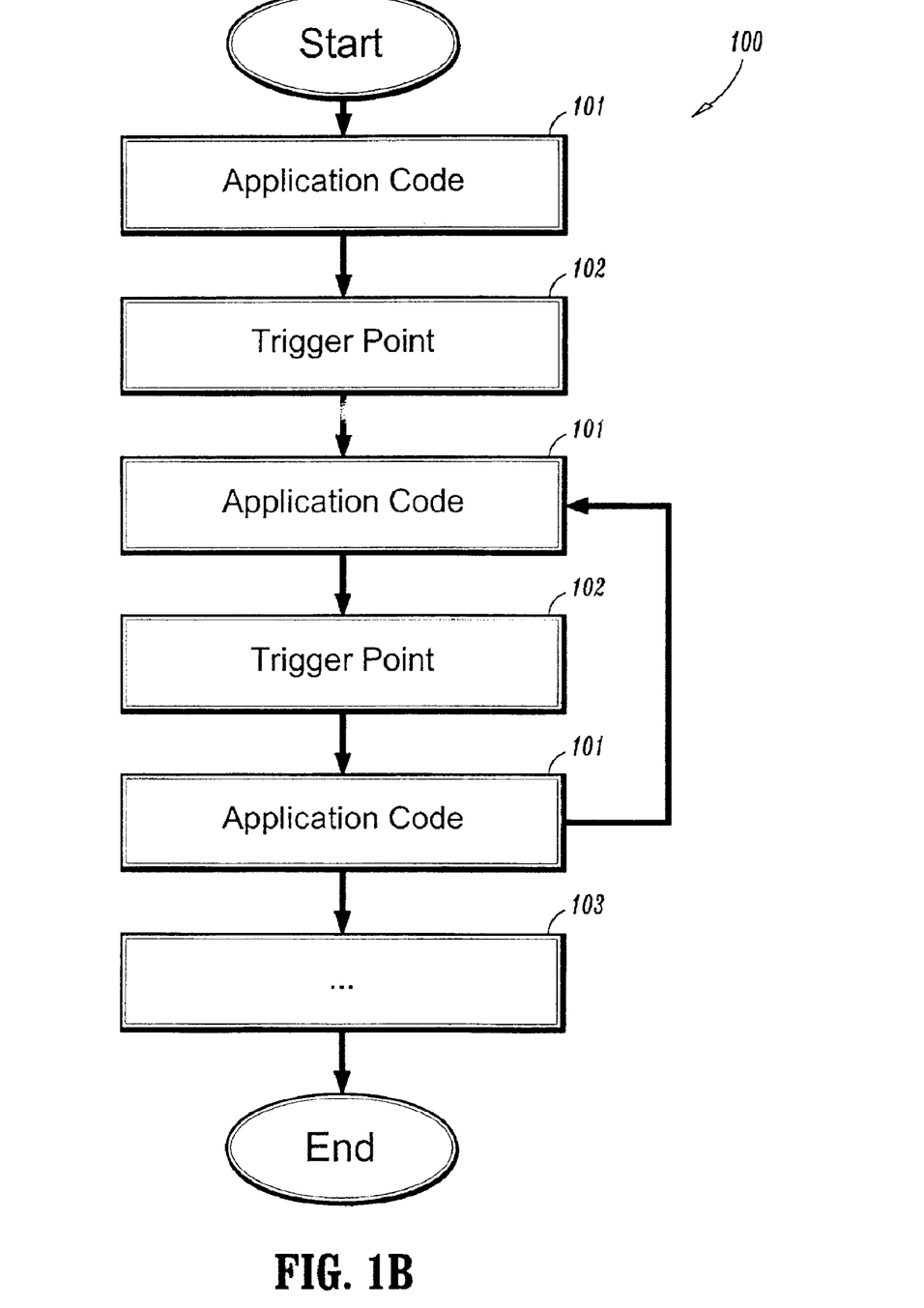
FIG. 1B is a block diagram illustrating an example application with trigger points program flow, in accordance with a preferred embodiment of the present invention.

FIG. 1B is a diagram illustrating an example application 100 with trigger points program flow, in accordance with a preferred embodiment of the present invention. The application 100 is depicted comprising application code 101 and trigger points 102. The application code 101 is that part of the application 100 which, once completed, generally remains fixed over time, unless a redesign occurs, or a bug is encountered, or some other unforeseen change is required. The trigger points 102 occur within the application 100 at locations where variability of logic over time is to be managed, typically in an externalized fashion. The remainder 103 of the application 100 is comprised of more application code 101 and trigger points 102.

The trigger points 102 are artifacts permanently placed within the application 100 in anticipation of behavioral modifications that will need to take place, either scheduled or unscheduled, at some future time. When encountered during application 100 runtime, the trigger points 102 establish a context, gather necessary information, appeal to an external entity for processing algorithms to apply, and produce some results. Before the trigger points 102 can carry out these tasks, they must first be configured.

The steps of the trigger point 102 configuration process are discussed with reference to FIG. 3 below and the steps of the trigger point 102 runtime appeal process are discussed with reference to FIG. 4 below.

Any particular trigger point 102 within the application 100 can be used zero, one, or multiple times during the course of operation as prescribed by the application code 101.

The trigger points 102 are comprised of two basic parts. One part consists of the general purpose code of the trigger point 102 embedded within the application 100 program. The other part is the externalized configuration information stored in a database, a file system, and so forth. The maintenance of the trigger point 102 externalized configuration information is discussed with reference to FIGS. 5, 6, and 7 below.

Figure 2:
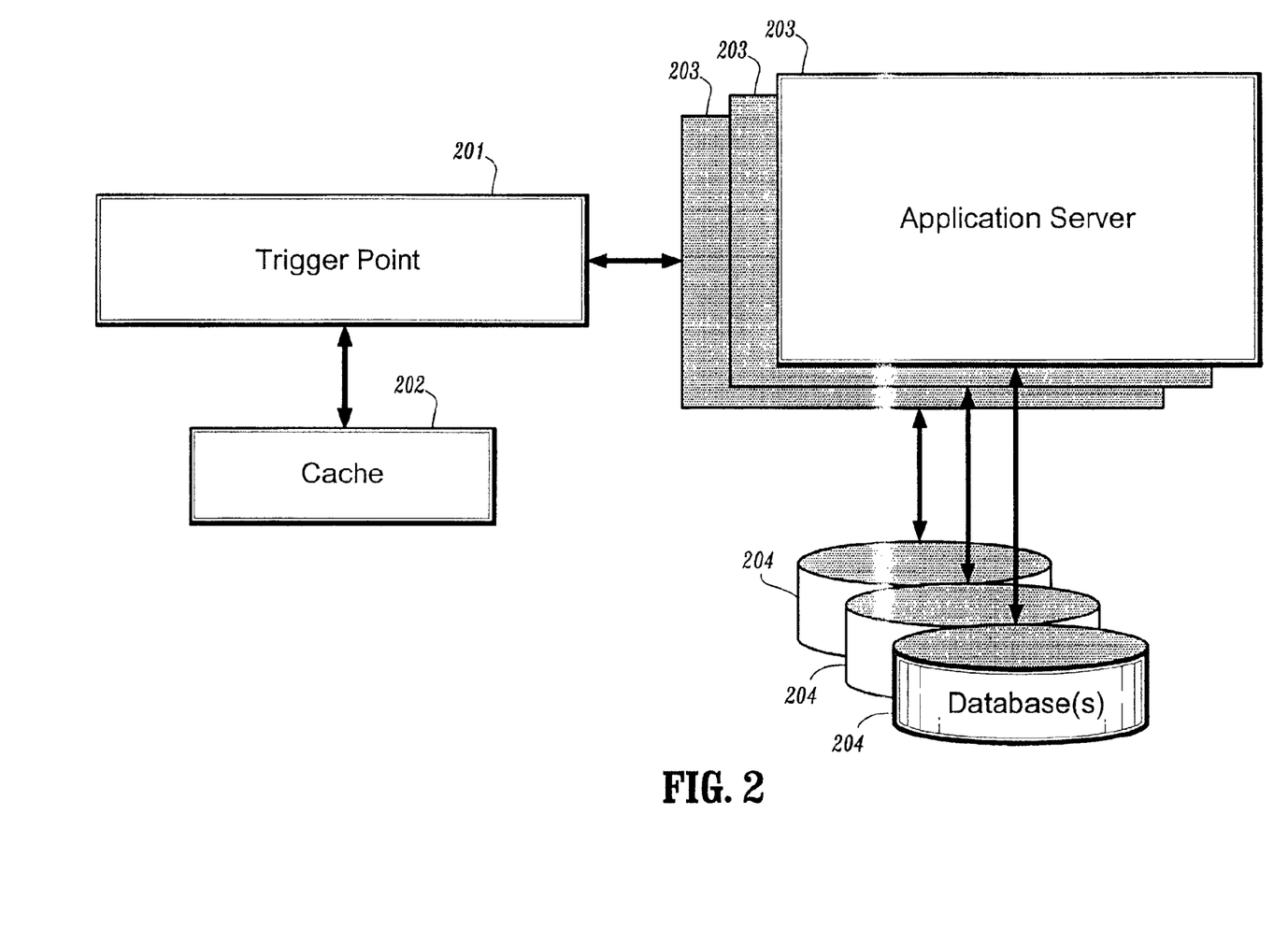
FIG. 2 is a block diagram illustrating trigger point interaction, in accordance with a preferred embodiment of the present invention.

FIG. 2 is a block diagram illustrating trigger point interaction, in accordance with a preferred embodiment of the present invention. In particular, a typical trigger point 201 is shown interacting with various representative entities. It is to be appreciated that the trigger point 201 interactions depicted herein are meant to be illustrative and not exhaustive and, thus, one of ordinary skill in the related art will readily contemplate these and various other entities with which the trigger point 201 may interact (e.g., file systems, networks, and objects, to name a few) while maintaining the spirit and scope of the present invention.

A trigger point 201 can either be pre-configured or on-demand configured. A trigger point 201 is pre-configured if configuration information is obtained and employed to configure the trigger point 201 prior to the first encountering of the trigger point 201 during the normal course of operations of the application 100. A trigger point 201 is on-demand configured when configured during its use, usually just the first use; however, a trigger point 201 may be reconfigured during subsequent uses.

The trigger point 201 configuration information persists in a database 204 accessed via an application server 203 and made available in a high speed manner from a cache 202. This is only one of a myriad of possible ways in which to save, restore, and utilize the externalized trigger point configuration data, and one of ordinary skill in the related art will be able to contemplate these and other similar arrangements while maintaining the spirit and scope of the present invention. The database 204 could be replaced by or used in conjunction with a file system or other means for storing data. The data could be accessed directly, or though an application server 203, or via an Internet connection, or by any other viable communication mechanism. The cache 202 could be local, or remote, or distributed, or simply not employed if speed of access is acceptable without a cache.

In the arrangement shown in FIG. 2, during application 100 configuration and/or runtime, a trigger point 201 interacts directly with a cache 202 and/or an application server 203 to obtain configuration information. The trigger point 201 first interrogates the cache 202 for the required configuration data, consisting of the various strategies to be employed as well as any constraints upon, for example, expected input into and output from the trigger point 201. The trigger point 201 configuration information is located by context as discussed below with reference to FIG. 3. If the information relative to the context at hand is not present in the cache 202, then an appeal is made to an application server 203 to obtain the configuration data. Once the configuration data has been retrieved from the application server 203 it is saved in the cache 202 for future use. The application server 203 interacts with the database 204 to gather the configuration data as necessary when requested.

Figure 3:
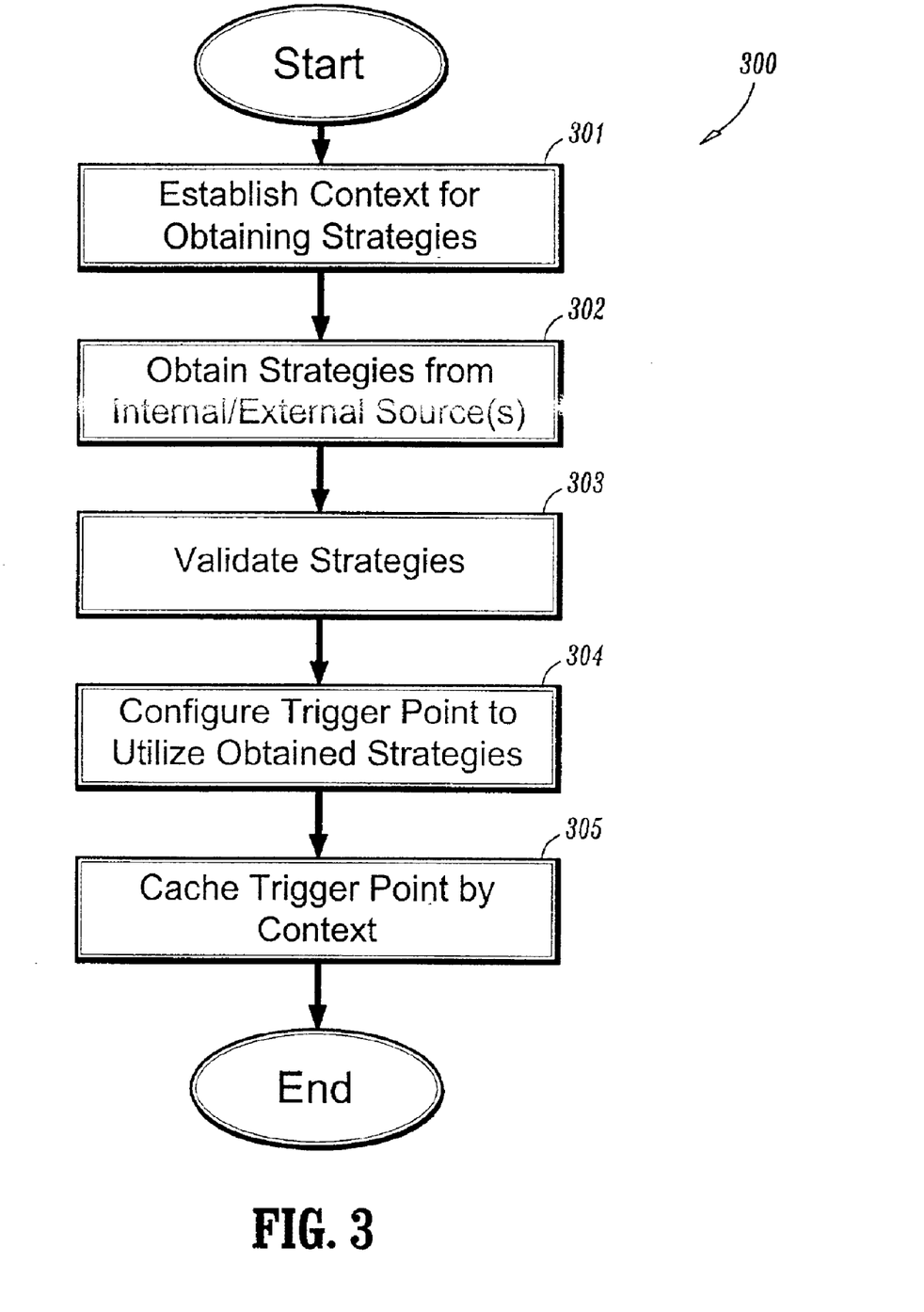
FIG. 3 is a flow diagram illustrating a method for configuring trigger points, in accordance with a preferred embodiment of the present invention.

FIG. 3 is a flow diagram illustrating a method 300 for configuring trigger points, in accordance with a preferred embodiment of the present invention. The diagram represents one particular general purpose method for performing the trigger point configuration-time task. One of ordinary skill in the related art will be able to contemplate this and other similar methods to accomplish the same while maintaining the spirit and scope of the present invention. For example, additional steps may be added, existing steps may be eliminated, steps may be ordered differently, or individual steps may be modified from that which is described herein.

The process starts by establishing a context for obtaining strategies (step 301). The trigger point context may be fixed or variable in nature. If the trigger point context is structurally oriented, such as being located at the start or end of a method call on an object, then the trigger point context may be fixed. For example, the trigger point context for a trigger point placed within application a at the entry point of method m on object o might be "amo"; then each time the trigger point within application a at the entry point of method m on object o is encountered during configure-time, the "amo" trigger point context will be used to locate the trigger point configuration data. If the trigger point is environmentally oriented, such as a decision point for choosing program flow, then the trigger point context may be variable. For example, the trigger point context for a trigger point placed within program p at the decision point d when the state is 1 might be pd1, whereas when the state is 2 at decision point d within program p, the trigger point context might be pd2, and so forth. Thus, whenever the trigger point within program p at decision point d is encountered, the trigger point context is calculated to be pd1 or pd2 (or so forth), based upon the environmental state. These and various other trigger point context establishment techniques will be readily determined by one of ordinary skill in the related art while maintaining the spirit and scope of the present invention.

Once a trigger point context is established, strategies are then obtained from internal/external source(s) (step 302). It is to be appreciated that a trigger point may have multiple context possibilities. Possible external sources for acquisition of strategies include but are not limited to a cache, an application server, or a database. Internal sources, such as static data contained within the application, are also permitted. These sources can be used individually or in combination. The established trigger point context described above with respect to step 301 is used as a key to obtain the required configuration data from the source or sources. The configuration data may include which strategies to employ, such as finding, filtering, firing, and combining, as described below with respect to FIG. 4. Other data may include expected input shape and cardinality, produced output shape and cardinality, and configuration information pertaining to the individual strategies employed, if indeed individually configurable.

After the configuration data has been retrieved, the strategies are validated (step 303) to give some measure of assurance that the various strategies will work together cooperatively, match expected inputs, outputs, and so forth. This validation is not to insure logical integrity in the sense of a guarantee that the desired result will be achieved, but rather it checks that expected inputs will satisfy the various input requirements of the strategies, that the various strategies are compatible with each other, and so forth. For example, a filtering strategy that required the production of at least two rules paired with a firing strategy that required the use of exactly one rule constitutes an invalid assembly of strategies. A default validation strategy is packaged within the generic trigger point which can be augmented or overridden by the downloaded strategies. The validate strategies step could be empty.

Subsequent to strategy validation, the trigger point is configured to utilize the obtained strategies (step 304). The generic trigger point has a default, replaceable set of strategies. For each trigger point, default strategies are replaced by obtained strategies (i.e., non-default) (per step 302), if any, based upon the determined trigger point context (per step 301). For example, the default combining strategy might be to return all results produced during execution of the firing strategy. However, the externally configured combining strategy for the trigger point context at hand, for example, context "patternP1", might be to return the logical "OR" of all produced results. Thus, the trigger point is customized to follow the externally defined combining strategy for its context. Moreover, until such time that the trigger point strategy is changed for its context, "patternP1", the trigger point so configured will employ the customized combining strategy of logical "OR" each time the trigger point is encountered during application execution.

Finally, the trigger point is cached by context (step 305). The configured trigger point is registered with a cache, if employed, for future reference. With respect to the application, the cache may be located locally or remotely, and may operate in a centralized or a distributed fashion. A key is calculated for use in identification of the cacheable trigger point. The key is used during the saving into and retrieving from the cache of the cacheable trigger point. The calculated key is based upon the trigger point context established above (per step 301). If caching is of no perceived benefit, because performance is not an issue, or insufficient resources exist, or caching does not significantly improve or even detracts from overall performance, then this step can be empty either for all trigger point contexts or some subset thereof.

Figure 4:
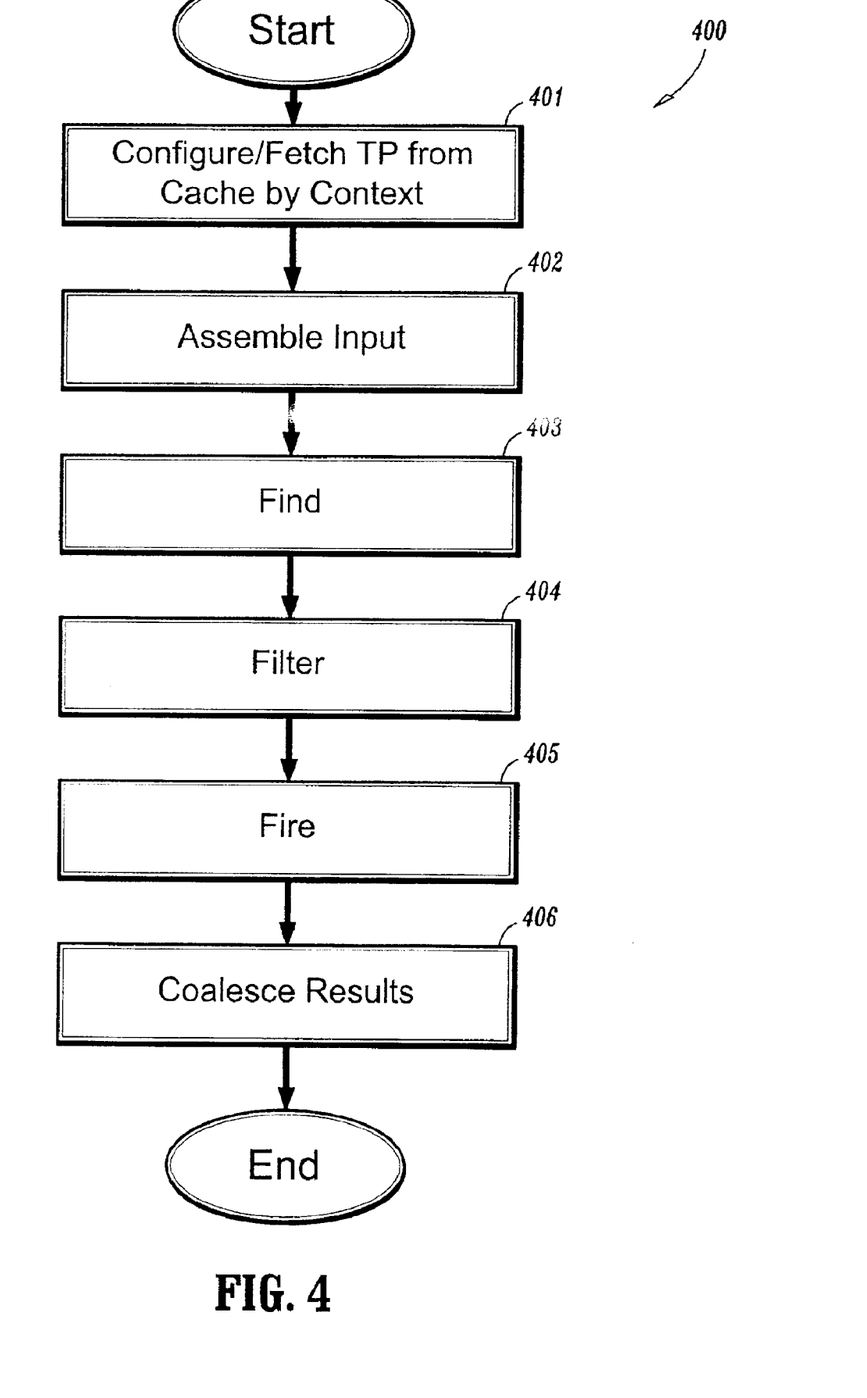
FIG. 4 is a flow diagram illustrating a method for executing trigger points, in accordance with a preferred embodiment of the present invention.

FIG. 4 is a flow diagram illustrating a method 400 for executing trigger points, in accordance with a preferred embodiment of the present invention. The diagram represents one particular general purpose method for performing the trigger point run-time task. One of ordinary skill in the related art will be able to contemplate this and other similar methods to accomplish the same while maintaining the spirit and scope of the present invention. For example, additional steps may be added, or existing steps may be eliminated, steps may be ordered differently, or individual steps may be modified from that which is described herein.

The method begins by configuring/fetching the trigger point from a cache by the context of the trigger point (401). If a cache is being used, then as in the establish context for obtaining strategies step above (per step 301), the current trigger point context is acquired; and as in the cache trigger point by context step above (per step 305), a key is calculated based upon the trigger point context; and the key is used to retrieve the trigger point from cache, if it exists there.

If a cache is not used, or if the trigger point is not found in cache, then the relevant portions of a trigger point configure-time flow diagram (the method of FIG. 3) are performed without duplication to obtain the trigger point configuration data; and to configure the trigger point; and if a cache is being used, to save the trigger point in cache for future use.

Once the trigger point has either been fetched from cache or newly configured, the remaining steps that employ the various trigger point strategies can be carried out. In the context of externalized business rules, the steps for which configured strategies are dispatched might be assemble input (step 402), find (step 403), filter (step 404), fire (step 405), and coalesce results (step 406).

It is to be appreciated that certain steps may be eliminated (e.g., the filter strategy might be empty). Moreover, other steps may be added (e.g., a security strategy might be employed prior to use of the fire strategy). Further, the trigger process may be more complex, as is the case for the situational triggering of business rules, where a first phase employs a strategy group to classify a business situation, and a second phase employs another strategy group to take action based upon the just determined classification, and so forth.

The assemble input (per step 402) strategy is employed to gather the necessary input required by the trigger point. This may involve accessing other objects, transforming data from one format into another, initializing objects, and so forth.

The find (per step 403) strategy is employed to gather the potential set of business rules that apply, given the current business context. The set of rules found may be empty, or may consist of one or more rules.

The filter (per step 404) strategy is employed to remove any rules that do not apply in the current situation. Also, it may discover unwanted predicaments, such as exactly one rule was expected but either none or many were returned.

The fire (per step 405) strategy is employed to dispatch any rules that remain subsequent to the find (per step 403) and filter (per step 404) steps.

The coalesce results (per step 406) strategy is employed to format the results of rule firing as expected for use by the application program enlisting the services of the trigger point. For example, if several rules are fired, then the coalesce strategy might be to logically "OR" the individual results together to form a single result.

Figure 5:
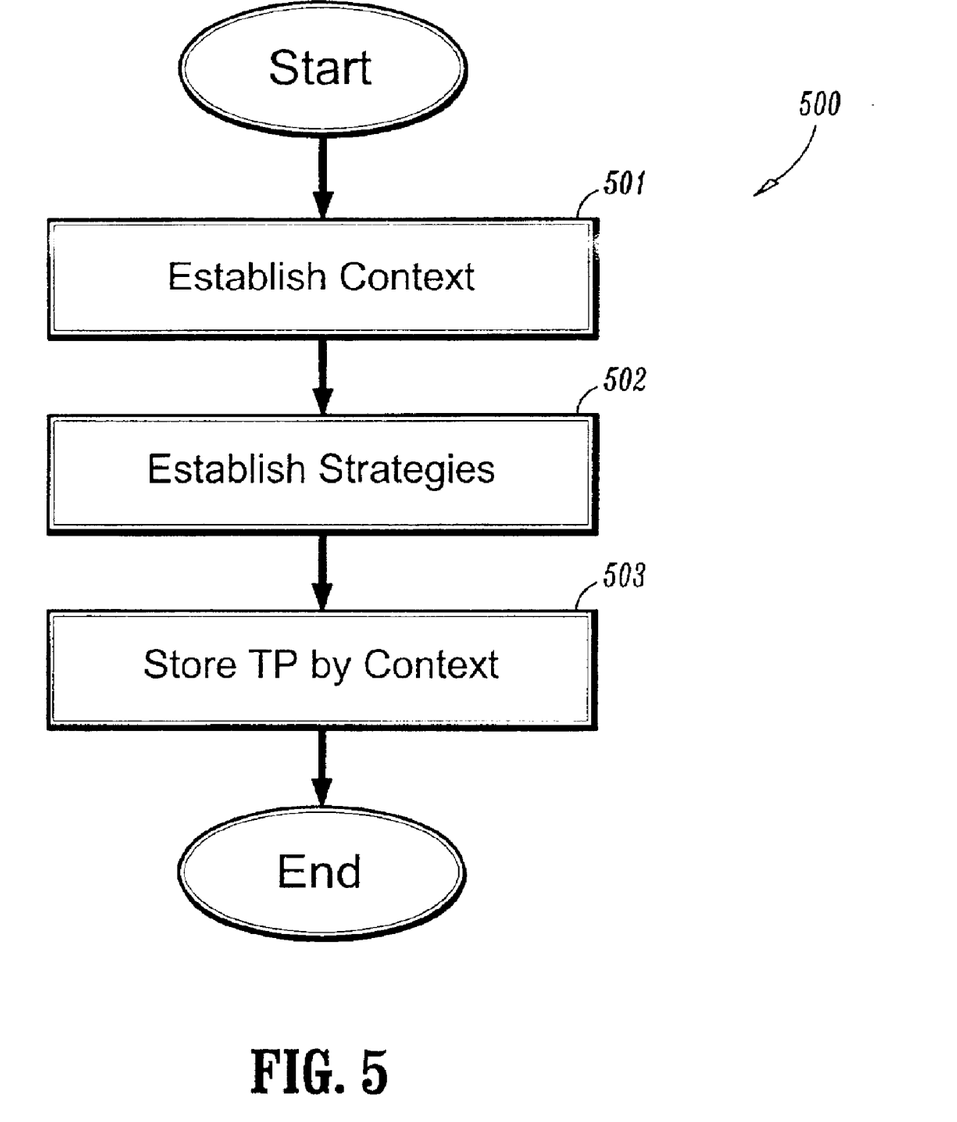
FIG. 5 is a flow diagram illustrating a method for creating persistent trigger points, in accordance with a preferred embodiment of the present invention.

FIG. 5 is a flow diagram illustrating a method 500 for creating persistent trigger points, in accordance with a preferred embodiment of the present invention. The diagram represents one particular general purpose algorithm for performing the persistent trigger point creation task. One of ordinary skill in the related art will be able to contemplate this and other similar methods to accomplish the same while maintaining the spirit and scope of the present invention. For example, additional steps may be added, existing steps may be eliminated, steps may be ordered differently, or individual steps may be modified from that which is described herein.

The first step shown in the process is to establish a storable context (step 501). One or more storable contexts can be attached to any particular group of strategies and any other associated configuration data. At least one of the specified storable contexts must correspond to an application trigger point context (as discussed above with reference to FIG. 3) for the data specifying the configuration of a trigger point to be accessible from a persistent store and, therefore, useable by a trigger point. Thus, there must be agreement between the trigger point context established by the application at configure- or run-time (as described above with respect to FIGS. 3 and 4) and the storable context which identifies the persistent data stored and retrieved from a database or other persistence mechanism.

The next step is to establish storable strategies (step 502) and other storable information necessary to configure a trigger point. These storable data are associated with the storable context or contexts established above (per step 501). At this point, some validation may occur to assure that the various storable strategies and other associated storable information are all compatible.

The final step is to store trigger point configuration data by context (step 503). The storable context and the associated storable strategies and any other storable data are stored in a database or other persistent location and the cache, if used and as appropriate. Once stored, applications (100 of FIG. 1B) are then free to reference and utilize the persistent information to configure trigger points by context. Step 503 fails if the context already exists. If the context already exists, then either the delete process should first be used or the update process should be used instead, each described below with respect to FIGS. 6 and 7, respectively.

Figure 6:
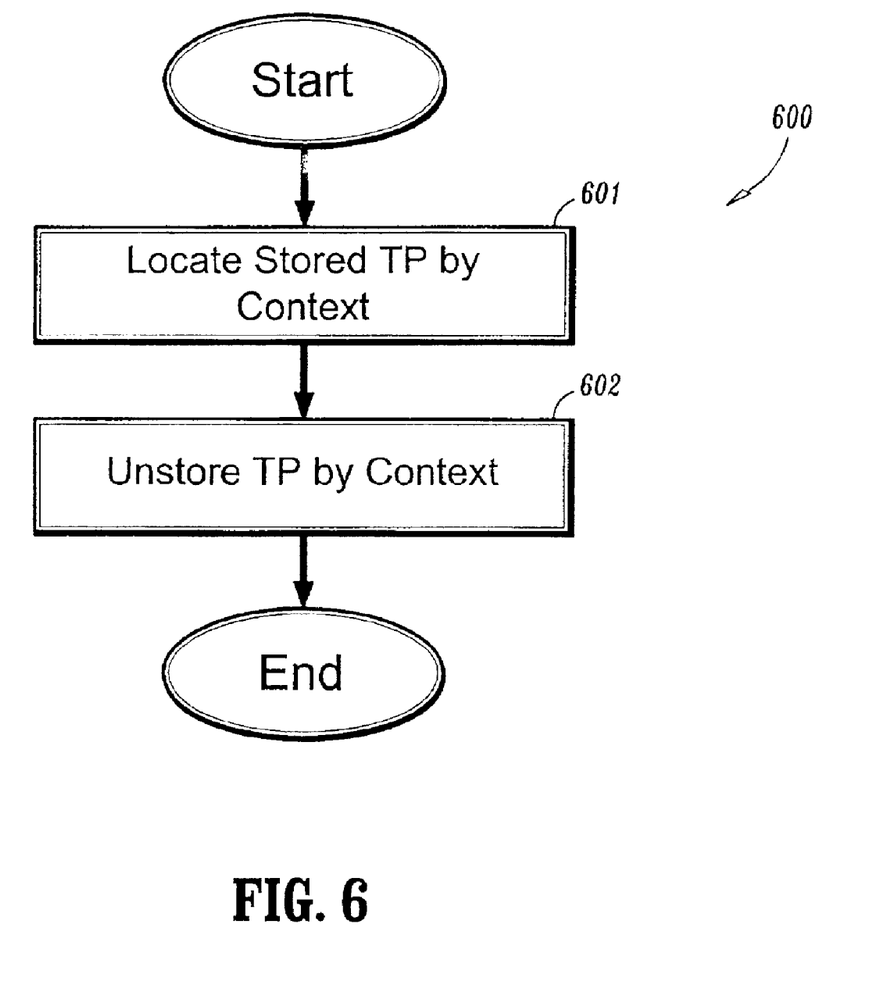
FIG. 6 is a flow diagram illustrating a method for deleting persistent trigger points, in accordance with a preferred embodiment of the present invention.

FIG. 6 is a flow diagram illustrating a method 600 for deleting trigger points, in accordance with a preferred embodiment of the present invention. The diagram represents one particular general purpose algorithm for performing the persistent trigger point deletion task. One of ordinary skill in the related art will be able to contemplate this and other similar methods to accomplish the same while maintaining the spirit and scope of the present invention. For example, additional steps may be added, existing steps may be eliminated, steps may be ordered differently, or individual steps may be modified from that which is described herein.

The first step is to locate a storable context (601). The storable context and the associated storable strategies and any other storable data may be stored in a database or other persistent location and the cache, if used and as appropriate. Next, the trigger point configuration is unstored, i.e., removed from the database or other persistent location and the cache (if used), by context (step 602). The storable context and the associated storable strategies and any other storable data are removed from a database or other persistent location and the cache, if used and as appropriate. Once removed from storage, applications (100 of FIG. 1B) are then unable to reference and utilize the persistent information to configure trigger points by context. Step 602 fails if the context does not exist.

Figure 7:
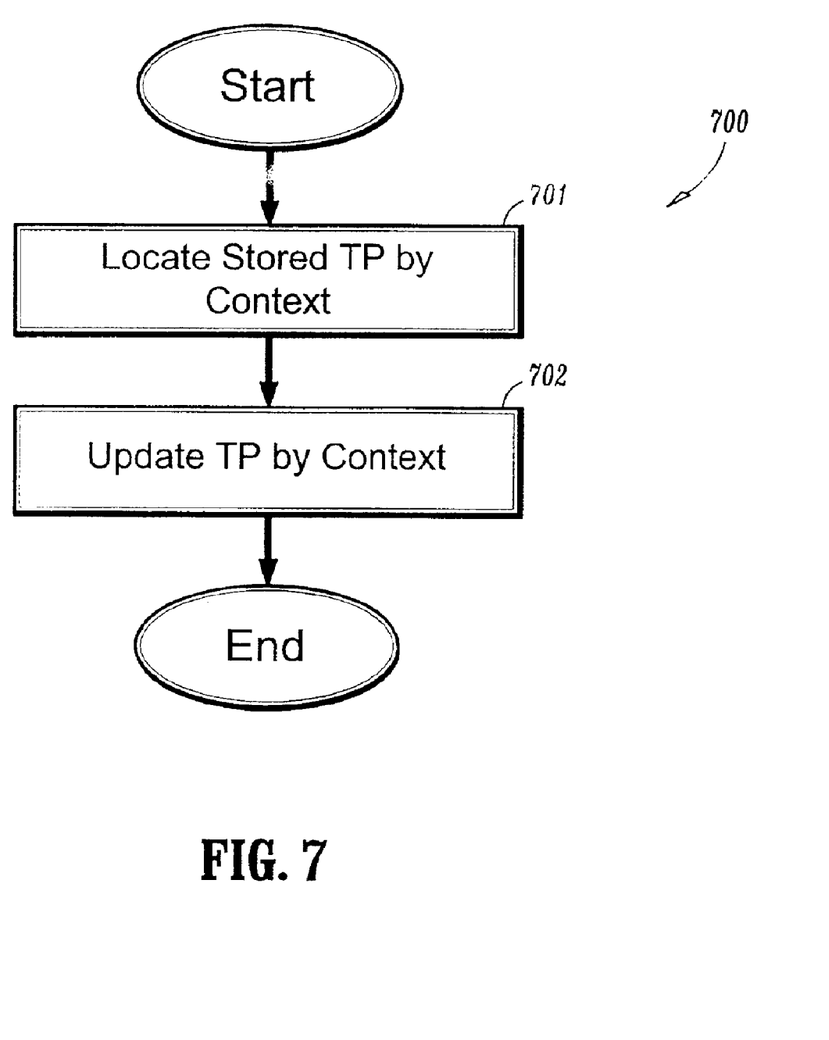
FIG. 7 is a flow diagram illustrating a method for updating persistent trigger points, in accordance with a preferred embodiment of the present invention.

FIG. 7 is a flow diagram illustrating a method 700 for updating trigger points, in accordance with a preferred embodiment of the present invention. The diagram represents one particular general purpose algorithm for performing the persistent trigger point update task. One of ordinary skill in the related art will be able to contemplate this and other similar methods to accomplish the same while maintaining the spirit and scope of the present invention. For example, additional steps may be added, or existing steps may be eliminated, steps may be ordered differently, or individual steps may be modified from that which is described herein.

The first step is to locate a storable context (step 701). The storable context and the associated storable strategies and any other storable data may be stored in a database or other persistent location and the cache, if used and as appropriate. Next, the final step of updating the trigger point configuration data by context (step 702) is performed. The storable context and the associated storable strategies and any other storable data are modified in a database or other persistent location and the cache, if used and as appropriate. Once modified, applications (100 of FIG. 1B) are then free to reference and utilize the changed persistent information to configure trigger points by context. Step 701 fails if the context does not exist.

Although the illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for employing a trigger point in a logic flow, the trigger point having at least one function associated therewith, the method comprising the steps of:

associating a default strategy set with the at least one function of the trigger point, the default strategy set having a capability of being replaced, in whole or in part, by a non-default strategy set, the strategy sets for implementing the at least one function of the trigger point;

dynamically configuring the trigger point, including the step of establishing at least one context for the trigger point, the at least one context respectively specifying a location of the default strategy set and the non-default strategy set; and executing the trigger point when the trigger point is encountered during an execution of the logic flow, including the step of determining a current context from among the at least one context each time the trigger point is encountered during the execution of the logic flow, to identify which portions, if any, of the default strategy set and the non-default strategy set are to be executed, and selectively executing at least a portion of at least one of the default strategy set and the non-default strategy set based upon the current context.

2. The method according to claim 1, wherein said configuring step further comprises the step of retrieving at least a portion of at least one of the default strategy set and the non-default strategy set, based upon the at least one context.

3. The method according to claim 1, wherein said configuring step further comprises the step of validating at least a portion of at least one of the default strategy set and the non-default strategy set.

4. The method according to claim 1, wherein said configuring step configures the trigger point to use the default strategy set.

5. The method according to claim 1, wherein said configuring step further comprises the steps of:

replacing at least a portion of the default strategy set with at least a portion of the non-default strategy set; and configuring the trigger point to at least use the portion of the non-default strategy set.

6. The method according to claim 1, wherein said configuring step further comprises the step of storing the trigger point based upon the at least one context.

7. The method according to claim 6, wherein said storing step stores the trigger point in a cache.

8. The method according to claim 1, wherein said executing step further comprises the step of retrieving at least the portion of at least one of the default strategy set and the non-default strategy set, based upon the current context.

9. The method according to claim 1, wherein said executing step comprises the steps of:

executing one of the default strategy set and the non-default strategy set during a first encounter of the trigger point; and executing another one of the default strategy set and the non-default strategy set during a subsequent encounter of the trigger point with respect to the first encounter.

10. The method according to claim 1, further comprising the step of externalizing the default strategy set with respect to the trigger point.

11. The method according to claim 1, further comprising the step of externalizing the non-default strategy set with respect to the trigger point.

12. The method according to claim 1, further comprising the step of initially generating the trigger point, including the steps of initially creating the at least one context and the default strategy set, and storing the at least one context and the default strategy set in a persistent storage device.

13. The method according to claim 1, further comprising the step of storing at least one of the at least one context and the default strategy set in a cache.

14. The method according to claim 1, further comprising the step of dynamically generating and augmenting the non-default strategy set, as specified by a user.

15. The method according to claim 1, wherein at least one of the default strategy set and the non-default strategy set comprise constraints on expected input and output from the trigger point.

16. The method according to claim 1, further comprising the step of deleting another trigger point, including the steps of locating another context established for the other trigger point to identify at least one location in at least one storage device of configuration data for the other trigger point, and deleting the configuration data from the at least one storage device.

17. The method according to claim 1, further comprising the step of updating the trigger point, including the steps of:

locating at least one given context from among the at least one context established for the trigger point to identify at least one location in at least one storage device of configuration data for the trigger point, the configuration data including the at least one given context, the default strategy set, and the non-default strategy set; and modifying at least one of the at least one given context, the default strategy set, and the non-default strategy set to update the trigger point.

18. The method according to claim 1, further comprising the step of changing one or more particular strategies associated with the at least one function of the trigger point by manipulating at least a portion of at least one of the default strategy set, the non-default strategy set, and the at least one context.

19. A system for employing a trigger point in a logic flow, the trigger point having at least one function associated therewith, the system comprising:

means for associating a default strategy set with the at least one function of the trigger point, the default strategy set having a capability of being replaced, in whole or in part, by a non-default strategy set, the strategy sets for implementing the at least one function of the trigger point;

means for dynamically configuring the trigger point, including means for establishing at least one context for the trigger point, the at least one context respectively specifying a location of the default strategy set and the non-default strategy set; and means for executing the trigger point when the trigger point is encountered during an execution of the logic flow, including means for determining a current context from among the at least one context each time the trigger point is encountered during the execution of the logic flow, to identify which portions, if any, of the default strategy set and the non-default strategy set are to be executed, and means for selectively executing at least a portion of at least one of the default strategy set and the non-default strategy set based upon the current context.

20. The system according to claim 19, wherein said means for configuring further comprises means for retrieving at least a portion of at least one of the default strategy set and the non-default strategy set, based upon the at least one context.

21. The system according to claim 19, wherein said means for configuring further comprises means for validating at least a portion of at least one of the default strategy set and the non-default strategy set.

22. The system according to claim 19, wherein said means for configuring configures the trigger point to use the default strategy set.

23. The system according to claim 19, wherein said means for configuring further comprises:

means for replacing at least a portion of the default strategy set with at least a portion of the non-default strategy set; and means for configuring the trigger point to at least use the portion of the non-default strategy set.

24. The system according to claim 19, wherein said means for configuring further comprises means for storing the trigger point based upon the at least one context.

25. The system according to claim 24, wherein said means for storing is a cache.

26. The system according to claim 19, wherein said means for executing further comprises means for retrieving at least the portion of at least one of the default strategy set and the non-default strategy set, based upon the current context.

27. The system according to claim 19, wherein said means for executing comprises:

means for executing one of the default strategy set and the non-default strategy set during a first encounter of the trigger point; and means for executing another one of the default strategy set and the non-default strategy set during a subsequent encounter of the trigger point with respect to the first encounter.

28. The system according to claim 19, further comprising means for externalizing the default strategy set with respect to the trigger point.

29. The system according to claim 19, further comprising means for externalizing the non-default strategy set with respect to the trigger point.

30. The system according to claim 19, further comprising means for changing one or more particular strategies associated with the at least one function of the trigger point by manipulating at least a portion of at least one of the default strategy set, the non-default strategy set, and the at least one context.

31. A method for employing a trigger point in a logic flow, the trigger point having at least one function associated therewith, the method comprising the steps of:

associating a default strategy set with the at least one function of the trigger point, the default strategy set having a capability of being replaced, in whole or in part, by a non-default strategy set, the strategy sets for implementing the at least one function of the trigger point;

dynamically configuring the trigger point, including the steps of establishing at least one context for the trigger point, the at least one context respectively specifying a location of the default strategy set and the non-default strategy set, and storing the trigger point based upon the at least one context; and executing the trigger point each time the trigger point is encountered during the execution of the logic flow, including the steps of determining a current context from among the at least one context to identify which portions, if any, of the default strategy set and the non-default strategy set are to be executed, and executing the identified portions.

32. The method according to claim 31, wherein said storing step stores the trigger point in a cache.

33. The method according to claim 31, further comprising the step of externalizing the default strategy set with respect to the trigger point.

34. The method according to claim 31, further comprising the step of externalizing the non-default strategy set with respect to the trigger point.

* * * * *